V. F. BENDIXEN.
FISHPOLE CLIP OR CLUTCH.
APPLICATION FILED JUNE 13, 1916.

1,236,659.

Patented Aug. 14, 1917.

Witnesses

V. F. Bendixen, Inventor by Attorneys

UNITED STATES PATENT OFFICE.

VICTOR F. BENDIXEN, OF CHICAGO, ILLINOIS.

FISHPOLE CLIP OR CLUTCH.

1,236,659.   Specification of Letters Patent.   Patented Aug. 14, 1917.

Application filed June 13, 1916. Serial No. 103,540.

*To all whom it may concern:*

Be it known that I, VICTOR F. BENDIXEN, a citizen of the United States, residing at Chicago, in the county of Cook and State of Illinois, have invented a new and useful Fishpole Clip or Clutch, of which the following is a specification.

The present invention is a clip or clutch applicable to a fishing pole for holding a fishing hook thereagainst, whereby to prevent it dangling loosely from the pole, and whereby to protect the hook, save annoyance and prevent injury, the device also being useful for holding the line against the pole to prevent the tangling thereof.

It is the object of the invention to provide an extremely simple and inexpensive clip or clutch of the nature indicated, which can be readily applied to and removed from a fishing pole for the purposes indicated, and which will serve its office in a thoroughly practical and serviceable manner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
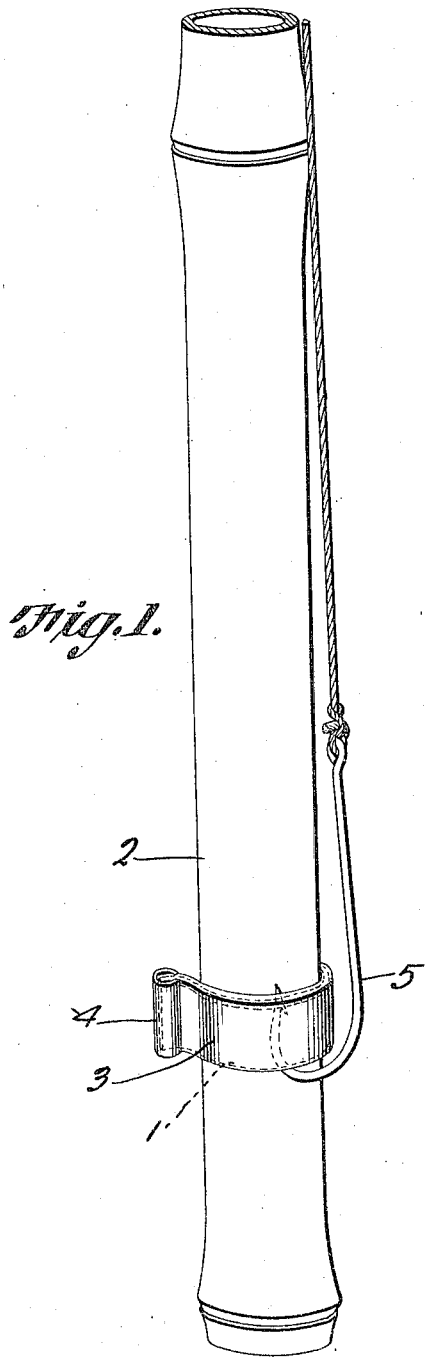
Figure 1 is a perspective view of the clip as applied to a fishing pole for holding the hook.
Figure 2:
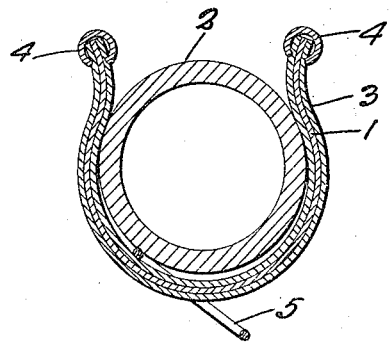
Fig. 2 is a section on the line 2—2 of Fig. 1.
Figure 3:
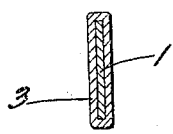
Fig. 3 is a cross section of the clip.

In carrying out the invention, the body 1 of the clip is formed of a strip or elongated piece of metal or other suitable material possessing the requisite resiliency and rigidity, the said strip or body being bent into U-shape with its terminals curved away from one another on diverging lines while the remainder of the strip extends through an arc slightly over 180 degrees so as to snugly embrace and maintain itself in position on the fishing pole 2. The clip may be constructed in various sizes for use upon various fishing poles.

The strip or body 1 is lined or faced with rubber or other equivalent material, and as a convenient means for doing this, a piece of rubber tubing 3 coextensive in length with the strip 1 is slipped thereover to conform to the shape thereof, said tubing entirely inclosing the strip to prevent it from injuring the point of the hook or other objects.

In order to maintain the tubing or covering 3 in place upon the strip 1, the ends of the tubing are fastened to the ends of the strip. As a convenient means for doing this, a pair of metallic fasteners 4 are used, the same being curved through an arc of over 180 degrees so as to surround the ends of the tubing and strip, and the fasteners 4 are contracted so that they grip the ends of the tubing and strip between their edges, the edges of the fasteners biting the tubing, whereby to maintain all of the parts in relative position. The fasteners 4 provide protectors for the ends of the clip, said fasteners being disposed transversely of the clip and extending along the ends thereof from one edge of the clip to the other.

In using the clip for holding a fish hook 5 against the pole 2, when the hook is not in use, the same is placed against the pole 2, as seen in Fig. 1, and the clip is then placed astride the pole and snapped into engagement therewith so that the intermediate portion of the clip will cover the pointed end or tip of the hook and clamp it against the pole. The resiliency of the strip or spring 1 enables it to snap into engagement with the pole and to tightly embrace the pole for holding the clip in place, and the tip or pointed end of the hook being held snugly behind the clip will be protected thereby, and the hook will also be held firmly in place to prevent the same from dangling loosely, and to avoid injuries and other annoyances. The fasteners or protectors 4 facilitate the application of the clip to the pole, since they enable the terminals of the clip to readily pass the opposite sides of the pole, and said fasteners 4 also prevent the ends of the covering or tubing 3 from being torn loose in applying or removing the clip. The rubber or equivalent lining of the clip will prevent it from slipping on the pole, as well as preventing the strip or spring from injuring the point of the hook. The clip can also be used for holding the line against the pole, thus to prevent the tangling thereof, since when the line is placed against the pole, the clip can be readily applied to the pole over the line to clamp it in place.

Having thus described the invention, what is claimed as new is:—

A clip comprising a strip, a tubular covering inclosing the same from end to end on both sides, and arcuate fasteners extending around the ends of the strip and having their edges projecting toward one another and biting the covering to hold the covering and fasteners in place upon the strip.

In testimony that I claim the foregoing as my own, I have hereto affixed my signature in the presence of two witnesses.

VICTOR F. BENDIXEN.

Witnesses:
M. JENSEN,
G. F. RYD.

Copies of this patent may be obtained for five cents each, by addressing the "Commissioner of Patents, Washington, D. C."